Sept. 22, 1959     J. DE RUGERIS     2,905,799
SOLDERING IRON
Filed July 25, 1958     2 Sheets-Sheet 2
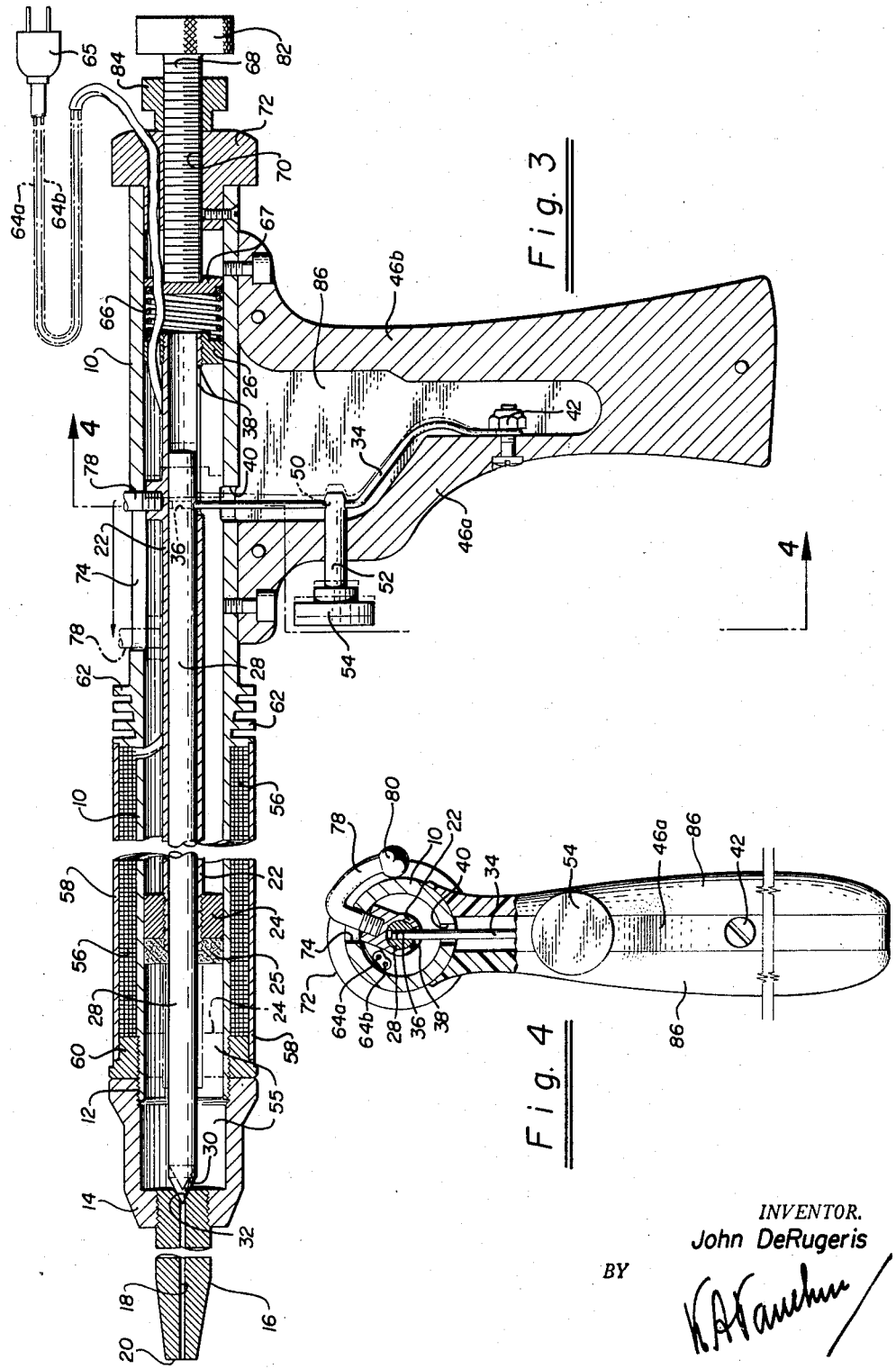
INVENTOR.
John DeRugeris
BY

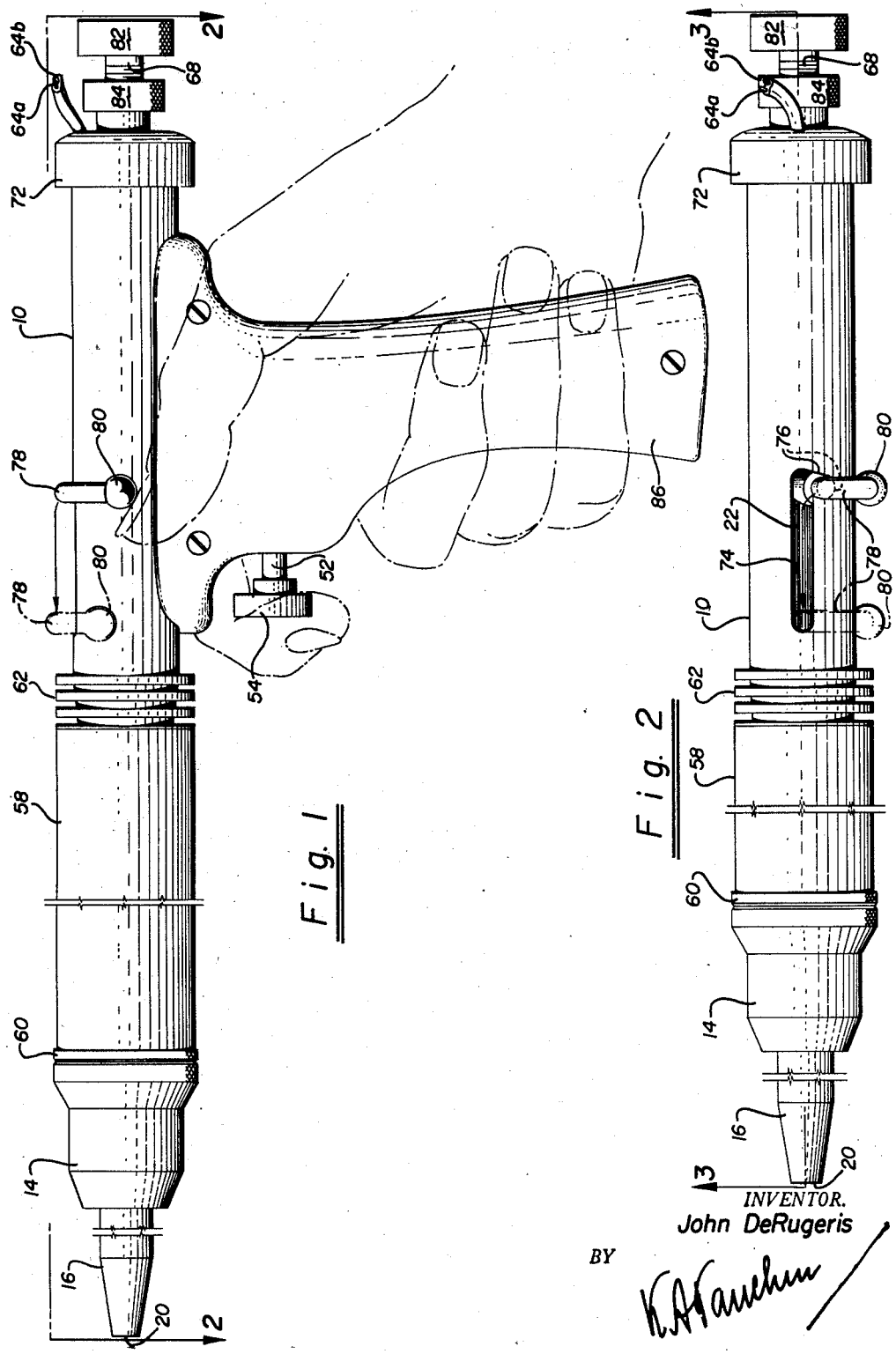

2,905,799

SOLDERING IRON

John de Rugeris, Campbell, Calif.

Application July 25, 1958, Serial No. 750,961

2 Claims. (Cl. 219—27)

The present invention relates to electrically heated soldering irons of the type having a heated reservoir chamber wherein the solder may be held in liquid form, and a valve mechanism that may be operated by the user to release the required amount of liquid solder at the soldering tip of the device.

It is an object of my invention to provide a soldering iron, of the type referred to, that is easy to hold and convenient to handle.

Another object of my invention is to provide a solder-feeding soldering iron, of the type referred to, that may conveniently be held in, and handled by, one hand and the controls of which may conveniently be manipulated by the fingers of the same hand that holds the device.

Still another object of the present invention is to provide a soldering iron, of the type referred to that may be used in any desired position and when so used may be held and manipulated by one hand of the user, leaving his other hand free to perform other tasks.

In this respect, it is a specific object of my invention to provide a solder-feeding soldering iron, of the type referred to, that will operate effectively when used in an upward direction and, when so used, may effectively be manipulated to feed solder by the same hand that holds the device.

Yet another object of the present invention is to provide a soldering iron, of the type referred to, that is of compact construction and pleasing appearance.

These and other objects of the present invention will be apparent from the following description of the accompanying drawing which illustrates a preferred embodiment thereof and wherein Figure 1 is a fragmentary side elevation of a soldering iron constructed in accordance with my invention;

Figure 2 is a fragmentary plan view of the soldering iron illustrated in Figure 1;

Figure 3 is a fragmentary longitudinal section through the soldering iron taken along line 3—3 of Figure 2 and viewed in the direction of the arrows associated with said line; and Figure 4 is a fragmentary transverse section through the device of the invention taken along line 4—4 of Figure 1 and viewed in the direction of the arrows associated with said line.

The soldering iron of the invention comprises a tubular body portion 10 of a suitable metal, such as aluminum, the front end of which is provided with external screw threads 12 (Figure 3), and threadably engaged upon said front end is a hollow nipple 14 which may likewise be of aluminum and which mounts a soldering tip 16 that may be of copper and which projects outwardly from said nipple. The soldering tip 16 is provided with a central solder discharge bore 18, which extends from within the nipple to the operating point 20 of the tip 16. Received within the tubular body portion 10 of the device is a tubular plunger 22 which carries upon its front end a piston 24 that is in sliding contact with the inner surface of the tubular body portion and the outer face of which is protected by a washer 25 of a fire-proof material, such as asbestos. At its rear end said plunger is provided with a guide piston 26 so that it may move in properly centered position within the tubular body 10.

Slidably received within the tubular plunger 22 is a stem-shaped valve member 28 the front end of which is formed into a conical valve closure tip 30 which fits into a valve seat 32 in the form of a conical depression provided in the inner end face of the soldering tip 16 around the inner end of the discharge bore 18 thereof. Said closure tip is normally held in closing position against said valve seat by means of a spring member 34 that engages a diagonal hole 36 in the valve stem 28 near the opposite end thereof which protrudes through a longitudinal slot 28 provided in the tubular plunger 22 on the under side thereof and an aligned slot 40 in the tubular body portion 10 (Figures 3 and 4) into the outside, where it is suitably secured to a point on the inner edge of a bifurcated handle 44 by a screw 42. Exteriorly, the conformation of said handle is similar to the conformation of a gun or pistol handle, and it is suitably attached to the body portion 10 of the device in such a manner that the forks 46a and 46b at either side of its hollow interior straddle the slot 40 in said body portion 10 (Figures 1 and 3). The spring member 34 is attached to the rear edge of the front fork 46a of the handle in such a manner that it urges the valve stem 28 yieldably with its conical tip 30 into engagement with the seat 32 in the soldering tip 16, as pointed out hereinbefore, and means are provided, on the handle 44, that may be operated in the manner of a gun trigger to force the spring member 34 backwards and cause it to withdraw the valve stem 28 with its closure tip 30 from the valve seat 32. For this purpose the spring member 34 extends through an aperture 50 in the inner end of a stud 52 that is slidably received within a horizontal bore in the front fork 46a of the handle, and the outer end of said stud carries a button 54 that may be pressed backwards by the forefinger of the hand which holds the handle of the device during practical use thereof.

The interior of the nipple 14, the front end of the tubular body portion 10, and the asbestos-covered front face of the piston 24 within said body portion define a reservoir chamber 55 within which liquefied soldering metal is contained when the device is used in practice and from which said liquefied soldering metal may escape through the bore 18 in the soldering tip 18 to its place of application whenever the button 54 on the handle 44 is pressed backwards. To melt the solder supplied to the chamber 55, preparatory to practical use of the device, and to keep it in liquid condition when the device is in use, a heating coil 56 is arranged around the front end of body portion 10. Said coil is covered by a sleeve 58 which is held in position by, and between, an internally threaded collar 60 engaged upon the externally threaded front end of the body 10 adjacent the nipple 14 and the first of a number of annular heat-dissipation vanes 62 that are integral with and project outwardly from the body portion 10 adjacent the opposite end of the coil 56. Insulated wires 64a and 64b lead from the opposite ends of the coil 56 through the wall of the tubular body into and along the interior thereof, and emerge at its rear end, as shown in Figure 3. Externally of the device, the wires 64a and 64b may be connected to a suitable contact plug 65, by means of which they can be plugged into an electric outlet to provide the heating coil with power whenever the device of the invention is to be used in practice.

In accordance with my invention I provide means which may be manipulated to cause the soldering iron to feed liquid solder through the bore 18, no matter in which position it may be held during use. For this purpose an expansion spring 66 is interposed in compressed condition between the rear face of the guide piston 26 on the inner end of plunger 22 and a disk 67 in front of the inner end of a threaded bolt 68 which extends through and is threadably engaged within the internally threaded bore 70 of a bushing 72 that is secured to and closes the rear end of the body portion 10 (Figure 3). In addition a latching means is provided that is normally effective to hold the plunger 22 in retracted position against the urgency or spring 66, and which may be released to permit said spring to force the piston 24 at the front end of the plunger 22 toward the nipple 14, and in this manner reduce the volume of the reservoir chamber and apply pressure to the liquefied soldering material contained therein so as to force it through the bore in the tip 16 into the outside whenever the valve release button 54 is manipulated, no matter in which position the device may be held at the time. For this purpose a longitudinally extending slot 74 is provided in the body portion 10 of the device (Figure 2) near and above the inner end of the plunger 22 and said slot has a cross run 76 (Figure 2) at its end remote from the nipple 14. Secured to the plunger 22 is a lever arm 78 that extends through the slot 74 in the body portion 10 into the outside where it is bent laterally over the outer surface of the body 10 on the right side thereof, as viewed in Figure 4, and terminates with a spherical operating knob 80. When the device of the invention is not in use, or the chamber 55 is to be supplied with solder, the operator grips the lever arm, forces the plunger 22 backwards against the urgency of spring 66 until the lever arm has moved within the slot 74 to a point adjacent its cross run 76, and then he turns the lever arm sideways so that it engages said cross run and is latched against the front edge thereof by the urgency of spring 66. When the lever arm 78 is in this position, its operating knob 80 is located adjacent the front fork 46a of the handle 44 at the left side thereof, as viewed from the rear of the device. When the plunger 22 is thus retracted, the reservoir chamber 55 between the nipple 14 and the front piston 24 has its maximum capacity, and the operator may now unscrew the nipple 14 from the front end of the body portion 10 and insert pellets, cubes or wires of solid soldering material into the front end of the device around the protruding valve rod 28. He then replaces the nipple 14 upon the front end of the soldering iron and screws it tightly into position to be sure that the closure tip 30 of the valve stem 28 bears tightly against the valve seat 32 and fully closes the bore 18 in the soldering tip 16.

The device may now be readied for operation by inserting the contact plug 65 at the end of leads 64a and 64b into an electric outlet to energize the heating coil 66. After an adequate time has elapsed for the heating coil to heat the front end of the device and to melt the soldering material in the reservoir chamber 55, the device is ready for use. The operator merely grips the handle 44 in the manner of a gun and disengages the lever arm 78 from the cross portion of the slot 74 which enables the spring 66 to expand and force the plunger 22 forwardly. This may be accomplished by pushing the thumb of the hand that holds the handle 44, upwardly against the spherical operating knob 80 of lever arm 78. With the lever arm 78 released, the spring 66 urges the front piston 24 against the liquefied soldering material in the reservoir chamber 55 and forces the liquefied solder against the nipple 14; and whenever it is desirable to feed soldering material from the reservoir 55 to the point of the soldering tip 16, the operator presses the trigger button 54 with the forefinger of the hand that holds the handle 44 (Figure 1), to withdraw the closure tip of the valve member 28 from the valve seat in the nipple 14, whereupon the piston will force the liquid solder through the bore 16 under the urgency of spring 66, no matter in what position the operator may hold the device to reach the particular place whereat a soldering operation is to be performed. In particular, the operator is now able to use the soldering iron in an upward direction for operation on points that can only be reached from below, without need to use his other hand for operating mechanisms to expel solder through the bore 18. To keep the spring 66 under proper tension, the threaded bolt 68 in bushing 72 is provided with a manipulating button 82 on its external end, which button may be turned manually to adjust the position of the bolt 68 and hence of the spring-constraining disk 67 relative to the end face of the guide piston 26. An internally threaded collar 84 may be arranged upon the external portion of the threaded bolt 68 in front of its operating button 82, and by tightening said collar against the outer end face of the bushing 72, the spring-constraining bolt 68 may be fixed in the position of adjustment to which it has been set by manipulation of its operating button 82. It remains to point out that suitable side panels of a heat insulating material, such as wood or plastic, may be secured to both sides of the handle 44, as indicated at 86 in Figures 1 and 4, to protect the operator's hand from contact with metallic areas of the device that may become hot during use.

The soldering iron of my invention is of simple and compact construction. It is of pleasing appearance. It may be gripped with one hand and may be readied for operation with the thumb of the hand that grips its handle 44 by pushing said thumb against the operating knob 80. This releases the plunger-latching lever 78 so that the solder contained in the reservoir chamber is placed under pressure; and whenever it is desired to feed solder through the tip 16, the trigger button 54 may be manipulated with the forefinger of the hand that holds the handle, to feed the solder to its place of use, even when the device must be pointed upwardly to reach the place where the soldering operation is to be performed. Thus one of the operator's hands is always left free to perform whatever other operation may be necessary to accomplish a given task.

While I have described my invention with the aid of a preferred embodiment thereof, it will be understood that the invention is not limited to the specific constructional details illustrated and described, which may be departed from without departing from the scope and spirit of my invention.

I claim:

1. A solder-feeding soldering iron comprising a tubular body portion having an open and a closed end; a bored nipple secured to said body portion at the open end thereof; a tubular plunger disposed concentrically within said tubular body portion; an apertured piston mounted upon the end of said plunger adjacent said nipple to form with said nipple a reservoir chamber of variable volume for liquid solder; spring means engaging said plunger to urge said piston thereof toward said nipple; latching means in and extending outwardly through the wall of said tubular body portion for retaining said plunger against the urgency of said spring means in a retracted position wherein said piston is withdrawn from said nipple; a handle secured to and projecting radially from said body portion adjacent the closed end thereof; the outwardly projecting portion of said latching means extending to a point adjacent said handle to be operable by the hand that grips said handle; a valve member having an end adapted to close the bore of said nipple slidably received within said tubular plunger; said tubular body portion having a slot in its wall adjacent said handle and said tubular plunger having a slot in alignment with the slot in said tubular body portion; a spring member secured to said handle and extending through said aligned slots into engagement with said valve member to urge the valve closure end thereof into closing engagement with the bore of said nipple; and means on said handle manually operable by the hand that grips said handle to force said spring member backwards and thus withdraw said valve member from the bore in said nipple, so that upon release of said latching means by the same hand, liquid solder is forced from said reservoir chamber through the bore of said nipple under the urgency of said piston.

2. A solder-feeding soldering iron comprising a tubular body portion having an open end and a closed end; a bored nipple detachably secured to said body portion at the open end thereof; a tubular plunger disposed concentrically within said tubular body portion; an apertured piston mounted upon the end of said plunger adjacent said nipple to form with said nipple a reservoir chamber of variable volume for liquid solder; spring means engaging said plunger to urge said piston thereof toward said nipple; a bifurcated handle having a front and a rear branch secured to said body portion adjacent the closed end thereof and projecting radially therefrom, said front branch having a front edge and a rear edge; latching means for retaining said plunger against the urgency of said spring means in a retracted position wherein said piston is withdrawn from said nipple, said latching means including a slot in the wall of said body portion extending longitudinally thereof and having a transverse run at its end remote from said nipple in the region opposite to the region where the said handle is secured to said body portion, and a lever arm secured to said plunger and extending outwardly through said slot, said lever arm being engageable behind the edge formed in the wall of said tubular body portion by the transverse run of said slot and its outwardly projecting part being bent downwardly over the outer surface of said tubular body portion with its end disposed adjacent said handle when said lever arm is in latching engagement with said transverse run, to be operable by the thumb of the hand that grips said handle; a rod-shaped valve member having an end adapted to engage said nipple and close said bore thereof slidably received within said tubular plunger, said tubular body portion having a longitudinally extending slot in its wall in the region intermediately of the branches of said bifurcated handle and said tubular plunger having an elongated slot in its wall in alignment with said last mentioned slot in the wall of said tubular body portion; a spring member secured to a point along the rear edge of the front branch of said handle and extending through said aligned slots into engagement with said valve member to urge the valve closure end thereof into closing engagement with the bore of said nipple; and means on the outer front edge of the front branch of said handle and extending slidably through said front branch, operable by the fore finger of the hand that grips said handle to force said spring member backwards and thus withdraw said valve member from the bore of said nipple so that, after release of said latching means, liquid solder may escape from said reservoir chamber through the bore of said nipple under the urgency of said piston.

References Cited in the file of this patent

UNITED STATES PATENTS

| 689,318 | Lee | Dec. 17, 1901 |
| 826,976 | Wagner et al. | July 24, 1906 |
| 1,400,148 | Frum | Dec. 13, 1921 |
| 1,819,671 | Buccola | Aug. 18, 1931 |
| 2,491,165 | De Rugeris | Dec. 13, 1949 |